(12) United States Patent
Takano (10) Patent No.: US 9,893,343 B2
(45) Date of Patent: Feb. 13, 2018

(54) BATTERY PACK AND ELECTRIC DEVICE

(71) Applicant: HITACHI KOKI CO., LTD., Tokyo (JP)

(72) Inventor: Nobuhiro Takano, Hitachinaka (JP)

(73) Assignee: HITACHI KOKI CO., LTD., Tokyo (JP)

(*) Notice: Subject to any disclaimer, the term of this patent is extended or adjusted under 35 U.S.C. 154(b) by 54 days.

(21) Appl. No.: 14/773,692

(22) PCT Filed: Feb. 28, 2014

(86) PCT No.: PCT/JP2014/055094
§ 371 (c)(1),
(2) Date: Sep. 8, 2015

(87) PCT Pub. No.: WO2014/148228
PCT Pub. Date: Sep. 25, 2014

(65) Prior Publication Data
US 2016/0049636 A1 Feb. 18, 2016

(30) Foreign Application Priority Data
Mar. 22, 2013 (JP) .................................. 2013-059634

(51) Int. Cl.
*H01M 2/34* (2006.01)
*H01M 10/42* (2006.01)
(Continued)

(52) U.S. Cl.
CPC .............. *H01M 2/34* (2013.01); *H01M 10/42* (2013.01); *H01M 10/425* (2013.01);
(Continued)

(58) Field of Classification Search
None
See application file for complete search history.

(56) References Cited

U.S. PATENT DOCUMENTS 4,694,686 A 9/1987 Fildes et al.
7,659,692 B2 2/2010 Sainomoto et al.
(Continued)

FOREIGN PATENT DOCUMENTS

CN 102812612 A 12/2012
JP 61-14838 A 1/1986
(Continued)

OTHER PUBLICATIONS

Extended European Search Report EP Application No. 14770752.5 dated Sep. 16, 2016.
(Continued)

*Primary Examiner* — Scott J. Chimielecki
(74) *Attorney, Agent, or Firm* — McDermott Will & Emery LLP (57) ABSTRACT

The present invention reduces or shuts off output electric power of a battery pack, which is connected to an electric device, depending on an abnormality. According to the present invention, a battery pack is detachably connected to an electric-device main body having a switch, and includes a first electric-power control circuit that outputs a first signal to the electric-device main body when the switch is operated, the first signal for allowing supply of electric power to the electric-device main body, a second switching element provided on an electric-power supply path that supplies electric power to the electric-device main body, and a second electric-power control circuit that outputs a second signal to the second switching element if an abnormality occurs in the battery pack, the second signal for reducing or shutting off the electric power supplied to the electric-device main body.

10 Claims, 7 Drawing Sheets

(51) Int. Cl.
*H01M 10/48* (2006.01)
*H02J 7/00* (2006.01)

(52) U.S. Cl.
CPC ......... *H01M 10/48* (2013.01); *H01M 10/482* (2013.01); *H02J 7/0031* (2013.01); *H02J 7/0045* (2013.01); *H01M 2/348* (2013.01); *H01M 10/486* (2013.01); *H01M 2010/4271* (2013.01); *H01M 2200/00* (2013.01); *H01M 2220/30* (2013.01); *H02J 7/0078* (2013.01); *H02J 7/0091* (2013.01); *H02J 2007/0067* (2013.01)

(56) References Cited

U.S. PATENT DOCUMENTS

| | | | |
|---|---|---|---|
| 7,932,701 | B2 | 4/2011 | Funabashi et al. |
| 9,028,988 | B2 | 5/2015 | Nakanouchi et al. |
| 2005/0202310 | A1* | 9/2005 | Yahnker .................. B25F 5/008 429/62 |
| 2010/0084150 | A1 | 4/2010 | Suzuki et al. |
| 2010/0117580 | A1 | 5/2010 | Miwa et al. |
| 2011/0080140 | A1* | 4/2011 | Hogari ................ H01M 10/486 320/134 |
| 2011/0197389 | A1* | 8/2011 | Ota .......................... B25F 5/00 15/339 |
| 2012/0225328 | A1 | 9/2012 | Nakanouchi et al. |
| 2013/0164589 | A1 | 6/2013 | Ota et al. |

FOREIGN PATENT DOCUMENTS

| | | |
|---|---|---|
| JP | 2005-131770 A | 5/2005 |
| JP | 2006-75227 A | 3/2006 |
| JP | 2007-000992 A | 1/2007 |
| JP | 2007-143284 A | 6/2007 |
| JP | 2008-62343 A | 3/2008 |
| JP | 2008-154395 A | 7/2008 |
| JP | 2012-182909 A | 9/2012 |
| WO | 2011/034201 A1 | 3/2011 |
| WO | 2012/005159 A1 | 1/2012 |
| WO | 2012/029982 A2 | 3/2012 |

OTHER PUBLICATIONS

International Search Report PCT/JP2014/055094 dated Jun. 3, 2014 with English translation.
PCT Third Party Observation EP Application No. 14770752.5 dated Sep. 29, 2015.
Office Action issued in corresponding Chinese Patent Application No. 201480013246.0, dated Jul. 4, 2017, with English Abstract.

* cited by examiner

BATTERY PACK AND ELECTRIC DEVICE

CROSS-REFERENCE TO RELATED APPLICATIONS

This application is the U.S. National Phase of PCT/JP2014/055094 filed Feb. 28, 2014 which claims priority to Japanese Patent Application No. 2013-059634 filed Mar. 22, 2013, the subject matter of each is incorporated herein by reference in entirety.

TECHNICAL FIELD

The present invention relates to a battery pack and to an electric device operated by the battery pack.

BACKGROUND ART

A so-called cordless electric tool using a charging-type battery pack as an electric-power source is widely spread. The battery pack normally incorporates a cell set, which is formed by serially connecting a plurality of battery cells, and lithium ion batteries are a mainstream as a battery type. The battery pack using the lithium ion batteries incorporates a protecting IC for monitoring the voltages of the respective battery cells or a voltage monitoring means having a function equivalent to that (protecting IC). If any of the battery cells is short-circuited or the voltage of the battery cell has reached a threshold of reaching an overdischarge state, an alarm signal is output from the protecting IC, and this is for stopping usage of the battery pack in response to that.

An electric tool which sets usage of the battery pack incorporating the protecting IC as a condition is configured to turn off a switching element, which is formed by a FET or the like provided on a current path flowing from the battery pack to a motor in the electric tool, in response to the alarm signal output from the protecting IC and forcibly terminate usage of the battery pack (for example, see Patent Document 1).

RELATED ART DOCUMENTS

Patent Documents

Patent Document 1: Japanese Patent Application Laid-Open No. 2008-62343

SUMMARY OF THE INVENTION

Problems to be Solved by the Invention

Figure 6:
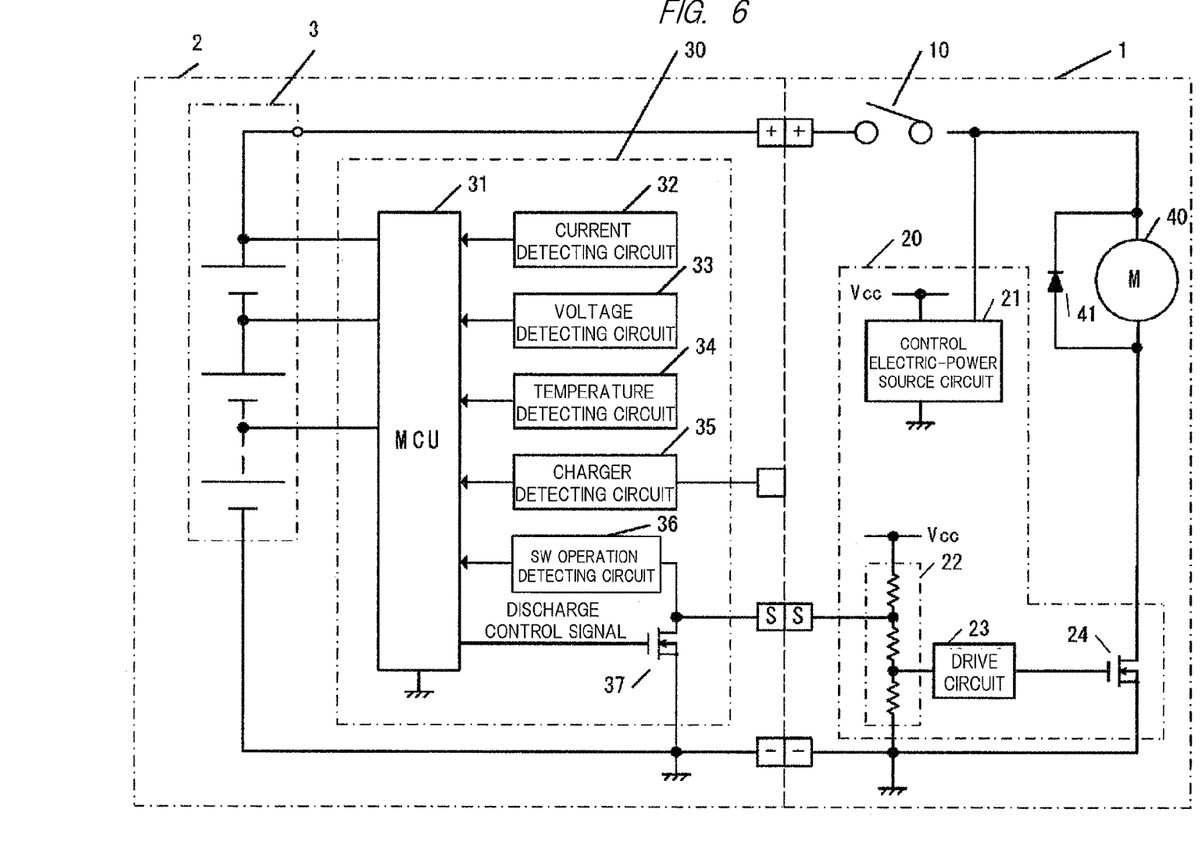
FIG. 6 is a block diagram showing an electric configuration of the battery pack and the electric-device main body according to a first conventional example of the present invention.

In an example shown in FIG. 6, a battery pack 2 is provided with a switch-operation detecting circuit 36. If a switch 10 provided on the electric-power supply path of an electric-device main body 1 is operated, an operation signal informing that the switch 10 has been operated is output to the battery pack 2 via a S terminal. When a MCU 31 provided in the battery pack 2 detects that the switch 10 has been operated by a switch-operation detecting circuit 35, it outputs a discharge allowing signal, which is for allowing discharge, to the electric-device main body 1 via the S terminal. In the electric-device main body 1, if the discharge allowing signal is input, the discharge allowing signal is transmitted from a drive circuit 23 to a switching element 24, which is provided on the electric-power supply path, and electric power supply to a motor 40 is started through the electric-power supply path.

Moreover, the battery pack 2 is provided with a monitoring circuit composed of a current detecting circuit 32, a voltage detecting circuit 33, a temperature detecting circuit 34, and the MCU 31. If an abnormality occurs in a cell set 3, the MCU 31 outputs a stop signal, which is for shutting off electric power supply, to the S terminal. If the stop signal is input from the S terminal, the electric-device main body 1 outputs the stop signal from the drive circuit 23 to the switching element 24 and shuts off electric power supply.

Figure 7:
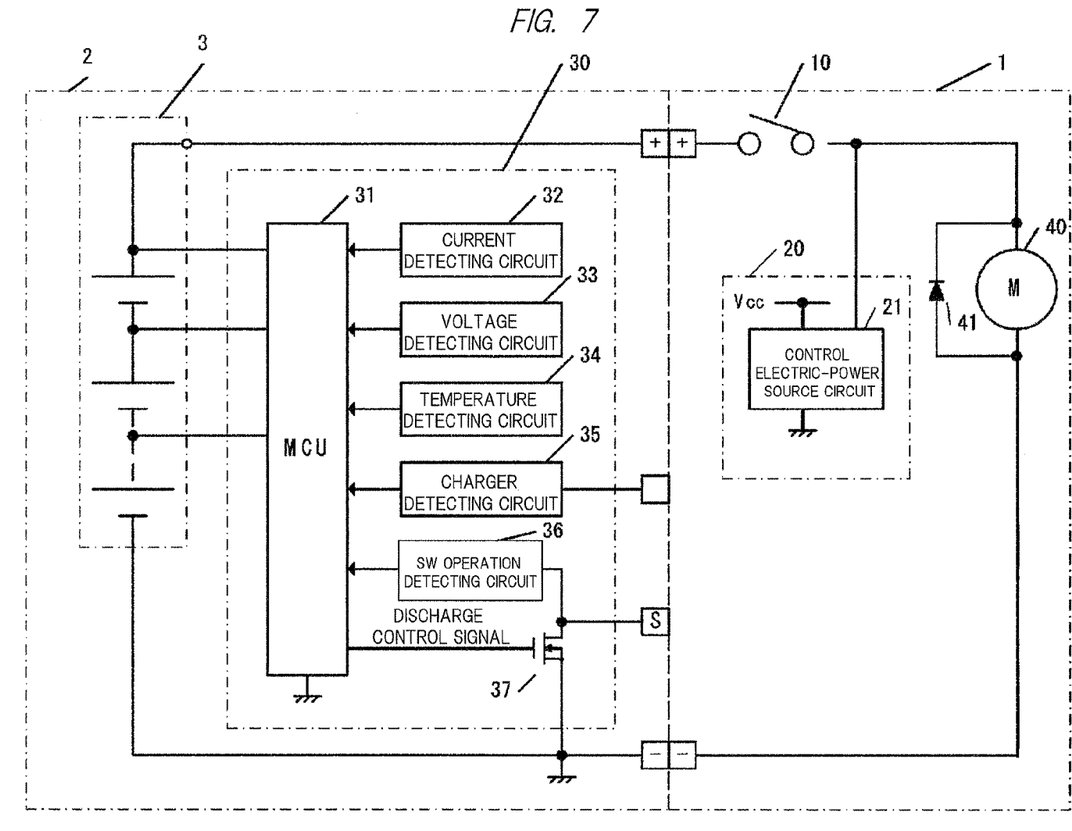
FIG. 7 is a block diagram showing an electric configuration of the battery pack and the electric-device main body according to a second conventional example of the present invention.

However, in the market, not only the electric-device main body 1 provided with the S terminal, the drive circuit 23, and the switching element 24 as shown in FIG. 6, but also an electric-device main body 1 not provided with them is also available. A state in which the above-described battery pack is connected to the electric-device main body 1 like this is shown in FIG. 7. In this case, the operation signal, which informs that the switch 10 has been operated, is not input from the electric-device main body 1. However, the switching element 24, which shuts off the electric-power supply circuit, is not present in the electric-device main body 1. Therefore, immediately after only the switch 10 is operated, the electric-power supply circuit is conducted, and electric power supply is started.

However, in this case, the S terminal is not present, and the stop signal, which informs occurrence of an abnormality in the cell set 3, is not input to the electric-device main body; therefore, electric power supply cannot be shut off even if an abnormality occurs in the cell set 3. In this manner, there has been a first problem that a battery pack which is configured to be able to shut off electric power supply upon abnormality of the cell set is not provided even when it is connected to either one of the electric-device main body as shown in FIG. 6 and the electric-device main body as shown in FIG. 7. Recently, increase in the capacities of cells has been advancing; however, in a case of usage of a cell having a large capacity exceeding some degree, the Electrical Appliance and Material Safety Low specifies provision of the configuration which shuts off electric power supply upon abnormality of the cell set. If a large-capacity battery pack which can be used for both of the electric-device main bodies of FIG. 6 and FIG. 7, in other words, the large-capacity battery pack which has compatibility is to be developed, this first problem has to be solved.

Meanwhile, in the example shown in FIG. 6, the abnormality is detected only by the monitoring circuit provided in the battery pack 2 to reduce or shut off electric power supply; however, the connected electric-device main body 1 is not limited to a high-load-type electric-device main body provided with a high-output motor or the like, but is also a low-load-type electric-device main body provided with a low-output lamp or the like. If the battery pack 2 is connected to the low-load-type electric-device main body, reducing or shutting off electric power supply after an abnormality of the cell set 3 occurs is too late, but it is more appropriate in some cases if an abnormality of the electric-device main body occurs first to reduce or shut off electric power supply faster. In this manner, there is a second problem that not only the battery pack, but also the electric-device main body should be protected.

Moreover, as described above, the conventional electric tool terminates usage of the battery pack in response to the alarm signal from the battery pack side; therefore, if a contact defect or the like of the S terminal, which is a signal terminal connecting the battery pack and the electric tool, occurs, there has been a problem that electric power cannot be normally switched to on/off. Moreover, there has been a third problem that, if a battery pack having an inappropriate rated voltage or the like is connected to the electric tool, electric power cannot be turned off in the electric tool side.

It is an object of the present invention to provide a battery pack capable of solving at least any of the above-described problems and an electric device provided with that.

Means for Solving the Problems

In order to achieve the above-described object, the present invention provides a battery pack detachably connected to an electric-device main body having a switch, and the battery pack includes a first electric-power control circuit that outputs a first signal to the electric-device main body when the switch is operated, the first signal for allowing supply of electric power to the electric-device main body, a second switching element provided on an electric-power supply path that supplies electric power to the electric-device main body, and a second electric-power control circuit that outputs a second signal to the second switching element if an abnormality occurs in the battery pack, the second signal for reducing or shutting off the electric power supplied to the electric-device main body.

According to the above-described configuration, the battery pack which can be commonly used also for an electric-device main body, which outputs an operation signal informing that the switch has been operated to the battery pack side, and also for an electric-device main body, which does not output such an operation signal to the battery pack side, can be provided. Moreover, the battery pack which can reduce or shut off electric power supply when an abnormality occurs in the battery pack not only in the case in which it is connected to an electric-device main body provided with a switching element which shuts off the electric-power supply path when a stop signal informing occurrence of an abnormality in the battery pack is input, but also in the case in which it is connected to an electric-device main body not provided with such a switching element, can be provided. Thus, the above-described first problem can be solved.

The battery pack is connected to the electric-device main body having a first switching element, which allows supply of the electric power when the first signal is input, on the electric-power supply path.

The battery pack is connected to the electric-device main body, which allows supply of the electric power when the switch is operated regardless of input of the first signal.

The battery pack is connected to the electric-device main body having a third electric-power control circuit, which outputs a third signal when an abnormality occurs in the electric-device main body, the third signal for reducing or shutting off the electric power supplied via the electric-power supply path to a third switching element provided on the electric-power supply path.

Further, the present invention provides an electric device in which a battery pack is connected to an electric-device main body, and the electric device includes the electric-device main body having a third electric-power control circuit, which outputs a third signal for reducing or shutting off electric power supplied via an electric-power supply path to a third switching element provided on the electric-power supply path if an abnormality occurs in at least any of the electric-device main body and the battery pack, and the battery pack having a second electric-power control circuit, which outputs a second signal for reducing or shutting off electric power supplied via the electric-power supply path to a second switching element provided on the electric-power supply path if an abnormality occurs in the electric-device main body or the battery pack.

According to the above-described configuration, if an abnormality occurs in the electric-device main body or the battery pack, each of the electric-device main body and the battery pack can reduce or shut off electric power supply. Therefore, even if a contact defect occurs at the terminal which transmits the signals between the electric-device main body and the battery pack due to vibrations in operations, wear of a contact point, etc., the abnormal state can be eliminated promptly. Thus, the above-described second problem can be solved.

A criterion of switching whether or not to output the third signal in the electric-device main body and a criterion of switching whether or not to output the second signal in the battery pack are mutually different criteria.

According to the above-described configuration, the electric-device main body and the battery pack can control shut-off or stop of electric power supply based on mutually different criteria. Therefore, for example, if the battery pack is connected to the high-load-type electric-device main body provided with a high-output motor or the like, the criterion of shutting-off or stopping electric power supply from the electric-device main body is set to be relatively high, and the criterion of shutting-off or stopping electric power supply from the battery pack is set to be relatively low; as a result, electric power can be supplied to the electric-device main body nearly to the limit which can be output by the battery pack, and high-load operations can be carried out. Meanwhile, for example, if the battery pack is connected to the low-load-type electric-device main body provided with a low-output lamp or the like, the criterion of shutting-off or stopping electric power supply from the electric-device main body is set to be relatively low, and the criterion of shutting-off or stopping electric power supply from the battery pack is set to be relatively high; as a result, it is made possible not to exceed the electric power which can be withstood by the lamp or the like of the electric-device main body. Thus, the second problem can be solved. Further, the present invention provides an electronic device including a connection means connected to a secondary battery, a shut-off means that shuts off a current from the secondary battery, a state monitoring means that monitors a state of the secondary battery, and a judgement means that predicts an abnormality based on a monitoring result of the state monitoring means and, if abnormality is predicted, shuts off the current from the secondary battery.

According to such a configuration, without depending on the battery pack, the electric device can independently predict the abnormality derived from the battery pack and can appropriately shut off the electric power. Thus, the above-described third problem can be solved.

The secondary battery has a predetermined rated value, and the judgement means judges the abnormality by comparing a predetermined value based on the rated value of the secondary battery and a monitoring result of the state monitoring means. According to such a configuration, the abnormality of the secondary battery can be appropriately predicted.

The judgement means judges the abnormality by comparing a predetermined value based on a rated value of the electric device and the monitoring result of the state monitoring means. According to such a configuration, the current can be appropriately shut down based on the rated value of the electric device.

The state monitoring means monitors at least one of the current supplied from the secondary battery and a voltage applied by the secondary battery.

The electronic device further includes a motor; and a rated value of the electric device is a rated voltage of the motor, and when the judgement means judges that the voltage applied from the secondary battery is outside a range of the rated voltage of the motor, the judgement means causes the shut-off means to shut off the current from the secondary battery to the motor.

The electronic device further includes a motor; and a rated value of the electric device is a rated current of the motor, and, when the judgement means judges that the current supplied from the secondary battery is outside a range of the rated current of the motor, the judgement means causes the shut-off means to shut off the current from the secondary battery to the motor.

The secondary battery outputs an alarm signal to the connection means, the alarm signal informing an alarm based on a state of the secondary battery, and when the connection means inputs the alarm signal, the judgement means causes the shut-off means to shut off the current, and when the abnormality is not predicted by the monitoring result of the state monitoring means and when the alarm signal is not received, the shut-off means does not shut off the current. According to such a configuration, the current can be appropriately shut down based on a judgement result by the judgement means and the alarm signal.

Effects of the Invention

The battery pack which has solved at least any of the above-described first to third problems and the electric device provided with the battery pack can be provided.

DETAILED DESCRIPTION OF PREFERRED EMBODIMENTS

Hereinafter, embodiments of the present invention will be explained with reference to accompanying drawings.

Figure 1:
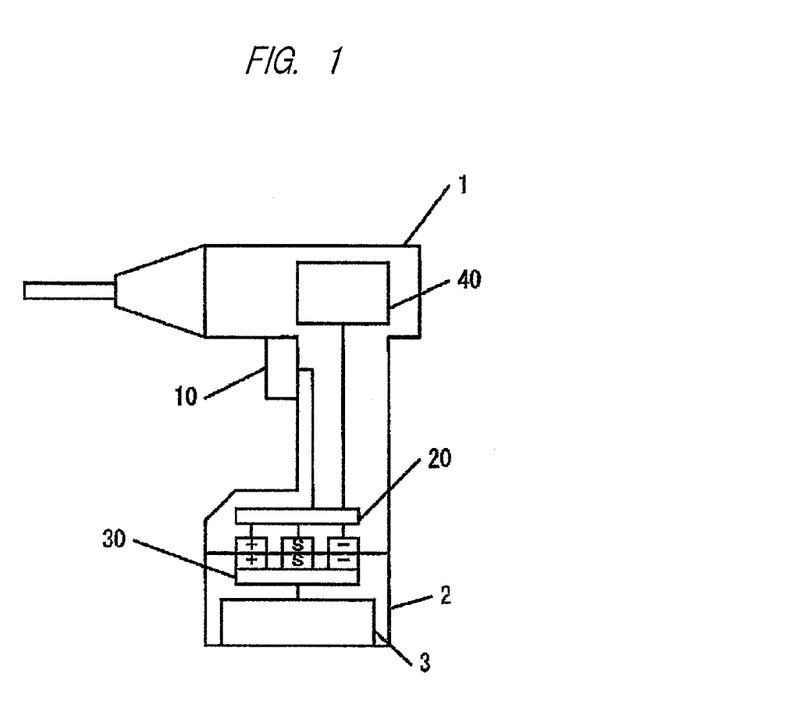
FIG. 1 is a schematic explanatory drawing showing a state in which a battery pack having a voltage monitoring function of each cell is attached to an electric-device main body.

FIG. 1 is a drawing showing a state in which a later-described 3-terminal-configuration battery pack 2, which is a secondary battery, and a monitoring-supporting electric-tool main body 1 are attached. The electric-tool main body 1 incorporates a motor 40 and a controller 20, and a switching element such as a FET is interposed in a current path through which a current flows to the motor 40. On battery-pack connecting surfaces, S terminals for inputting alarm signals are formed in addition to plus terminals and minus terminals. The S terminal of the tool side is a terminal for inputting the alarm signals output from the battery pack 2 when at least one cell voltage reaches a threshold value of reaching an overdischarge state. The electric-tool main body 1 is provided with a trigger switch 10 for driving an electric tool.

The battery pack 2 incorporates a cell set 3, which is formed by serially connecting a plurality of cells, and a controller 30 serving as a battery-voltage monitoring means, which monitors the voltages of the battery cells of the cell set 3 and, outputs an alarm signal when the voltage of at least any of the battery cells is reduced to a reference value or lower than that. In a state in which the battery pack 2 is attached to the electric-tool main body 1, the plus terminal of the battery pack 2 and the plus terminal of the electric-tool main body 1 are electrically connected with each other and the minus terminal of the battery pack 2 and the minus terminal of the electric-tool main body 1 are electrically connected with each other, and the S terminal of the battery pack 2 and the S terminal of the tool-main-body side are also electrically connected with each other. The S terminal of the tool-main-body-1 side is connected to the controller 20. When the alarm signal is input from the S terminal of the battery pack 2, the controller 20 turns off the FET to release the current path and forcibly terminate usage of the battery pack 2.

Figure 2:
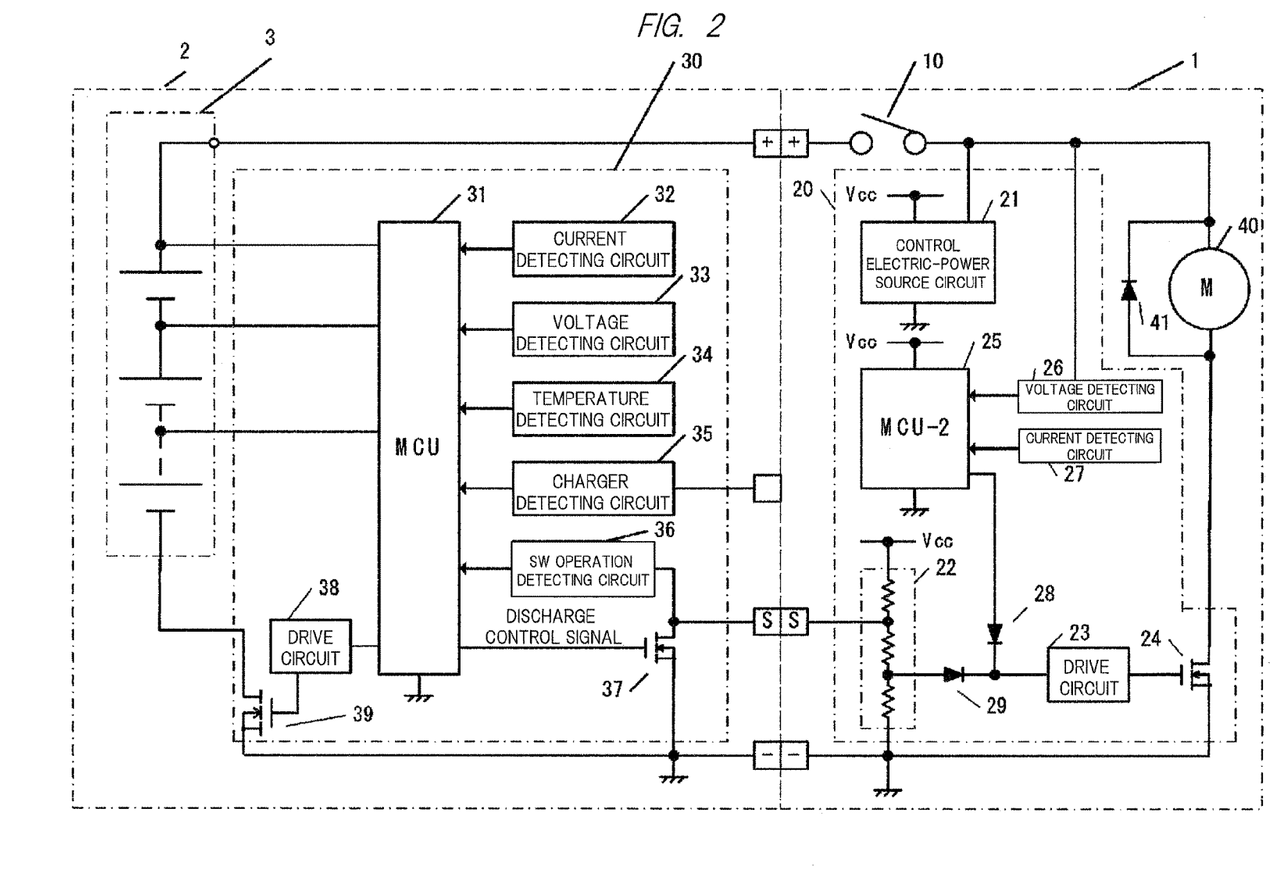
FIG. 2 is a block diagram showing an electric configuration of the battery pack and the electric-device main body according to a first embodiment of the present invention.

FIG. 2 is a block diagram showing an electric configuration of the battery pack 2 and the electric-tool main body 1. As shown in FIG. 2, the cell set 3, for example, serially connects a plurality of battery cells of lithium ions or the like. Note that, although omitted in FIG. 2, a plurality of cell sets 3 may be connected in parallel. Examples include a 14.4-V battery pack 2 in which four battery cells having a rated voltage of 3.6 V are serially connected and a battery pack 2 in which five battery cells having a rated voltage of 3.6 V are serially connected. Moreover, in accordance with the battery capacity per one cell and the number of the cell set (s) 3 connected in parallel, the battery capacity of the battery pack 2 is determined. In the present embodiment, for example, that of 3.0 Ah in which two cell groups of 1.5 A are connected in parallel per one cell of the battery cell or that of 4.0 Ah in which two cell groups of 2.0 A are connected in parallel per one cell is used. However, the number of the cell groups and the capacity per one cell of the battery cell are not limited thereto.

The battery pack 2 further has the control unit 30, and the control unit 30 incorporates a micro computing unit 31 (hereinafter, referred to as "MCU 31") serving as a controller and detects the voltages of the battery cells constituting the cell set 3. Other than that, the battery pack 2 is provided with a current detecting circuit 32, a voltage detecting circuit 33, a temperature detecting circuit 34, a charger detecting circuit 35, a drive circuit 38, and a FET 39. The current detecting circuit 32 detects the current which flows from the battery pack 2 to the electric-tool main body 1 and is composed of a shunt resistance. The voltage detecting circuit 33 is a circuit which detects the voltage of the battery pack 2 from the divided voltage values of two resistances connected in parallel to the battery pack 2. The temperature detecting circuit 34 is a circuit which detects the temperature of the cell set 3 by a thermosensitive element such as a thermistor, which is disposed to be in contact with or in the vicinity of the battery pack 2.

The charger detecting circuit 35 is a circuit for detecting that the battery pack 2 is connected to a charger in accordance with the voltage input from the charger side via a charger connecting terminal when the battery pack 2 is connected to the charger, which is not shown in the drawing.

At least four terminals, i.e., the charger connecting terminal, the plus terminal, the minus terminal, and the S terminal each described above are formed on the battery pack 2; however, upon connection to the electric-tool main body 1, only the three terminals, i.e., the plus terminal, the minus terminal, and the S terminal are connected to the corresponding terminals of the electric-tool main body 1. Therefore, for the sake of explanation, the battery pack 2 as shown in FIG. 2 is referred to as a three-terminal-configuration battery pack. Note that the charger connecting terminal and the S terminal are integrally formed.

Other than the voltages of the battery cells of the battery pack 2, various detection signals from the current detecting circuit 32, the voltage detecting circuit 33, the temperature detecting circuit 34, and the charger detecting circuit 35 are input to the MCU 31 incorporated in the battery pack 2. Based on these detection signals, a discharge control signal is output from the MCU 31. The discharge control signal is applied to a gate of a FET 37, and a drain potential of the FET 37 serves as an S-terminal output.

The control unit 30 is further provided with a SW operation detecting circuit 36, detects whether the trigger switch 10 of the electric-tool main body 1 is turned on by an operator or not, and inputs a detection result to the MCU 31. Specifically, when the operator turns on the trigger switch 10, a state in which the battery pack 2 and the electric-tool main body 1 are electrically connected is obtained. More specifically, a current path connecting the plus terminal of the battery pack 2, the plus terminal of the electric-tool-main-body-1 side, the motor 40, the minus terminal of the electric-tool-main-body-1 side, and the minus terminal of the battery-pack-2 side is formed. When the current path is formed, a reference voltage Vcc generated by using the cell set 3 as an electric-power source in the battery-pack-2 side is applied to the electric-tool-main-body-1 side. As described later, the electric-tool-main-body-1 side is provided with a resistance set 22 in which three resistances R1, R2, and R3 are serially connected between Vcc and a ground, the divided voltage values of R2 and R3 are applied to the SW operation detecting circuit 36 via the S terminal, and the fact that the trigger switch 10 has been turned on is transmitted to the MCU 31 by the SW operation detecting circuit 36. When the trigger switch 10 is off, the voltage input to the SW operation detecting circuit 36 via the S terminal of the battery pack 2 is a voltage value (ground potential) lower than the voltage which is input when the trigger switch 10 is on.

When the trigger switch 10 is turned on, the MCU 31 outputs a high-level discharge control signal to the FET 37.

When the once the trigger switch 10 is turned on and the high-level discharge control signal is output to the FET 37, while the voltages of all the cells constituting the cell set 3 are in a normal state, the discharge control signal output from the MCU 31 is at the high level, and the FET 37 is on. Therefore, a low-level (earth potential) signal is output from the S terminal of the battery pack side to the tool main-body side. On the other hand, if the MCU 31 predicts an abnormality while the electric tool is in a drivable state or driven, the MCU 31 switches the discharge control signal, which has been at the high level, to the one at a low level.

Predicting an abnormality also means detecting obtainment of an abnormal state which leads the battery pack, the electric-device main body, etc. to damage, but also includes a meaning that damage is about to be caused although damage has not yet been caused. In the present embodiment, examples of predicting the abnormality include a case in which reduction of the voltage of at least one of the battery cells to the reference value is detected. The reference value referred to herein is the threshold value of becoming the overdischarge state if the voltage is further reduced, and, for example, 2.0 V per cell serves as the reference value. If the MCU 31 detects that the cell voltage is reduced to 2.0 V, as described above, the discharge control signal becomes the low level. This signal corresponds to the alarm signal output from the MCU 31 serving as the battery-voltage monitoring means. If the discharge control signal becomes the low level, the FET 37 is turned off, and the voltage of the S terminal becomes equal to a potential higher than the ground level, more specifically, the divided voltage values of the resistances R1, R2, and R3 of the tool main body side.

The MCU 31 controls the FET 39 via the drive circuit 38. The MCU 31 turns off the FET 39 when an abnormality is predicted and, in a state other than that, turns on the FET 39. More specifically, if the voltages of all the cells constituting the cell set 3 are in a normal state, the MCU 31 turns on the FET 39 to enable output of electric power from the battery set 3. On the other hand, if the fact that the voltage of at least one of the battery cells is reduced to the above-described reference value is detected while the electric-tool main body 1 is in a drivable state or driven, the discharge control signal, which has been at the high level, becomes the one at the low level.

Note that, when the current detecting circuit 32 detects a current value larger than a predetermined current value, the MCU 31 may be configured to turnoff the FET 39 and changes the discharge control signal to the low level. This is for a reason that the electric-tool main body 1 may be damaged if the current value becomes larger than a predetermined current value. Alternatively, the FET 39 may be subjected to PWM control by the drive circuit 38 so as to reduce an effective current. As a result of this, the output electric power can be reduced. Moreover, the current value may be provided with a lower limit, and, if the current value is lower than the lower limit value, the MCU 31 may turn off the FET 39 and change the discharge control signal to the low level.

Next, a configuration of the electric-tool main body 1 will be explained. The electric-tool main body 1 is provided with the control unit 20 in addition to the trigger switch 10 and the motor 40. The control unit 20 incorporates a micro computing unit 25 (hereinafter, referred to as "MCU-2") serving as a controller. The control unit 20 is further provided with a control electric-power-source circuit 21, a voltage detecting circuit 26, a current detecting circuit 27, and the resistance set 22. The control electric-power-source circuit 21 is provided in the downstream side of the switch 10 and, when the switch 10 is turned on, converts the electric power from the battery pack 1, thereby applying a control voltage Vcc to the MCU-2 and the resistance set 22.

The voltage detecting circuit 26 detects the voltage applied to the motor 40 from the divided voltage values of two resistances connected in parallel to the motor 40 and inputs a detection result to the MCU-2. The current detecting circuit 27 is composed of, for example, a shunt resistance, detects the current which flows to the motor 40, and inputs a detection result to the MCU-2. A diode 41 inversely biased in parallel to the motor 40 is connected and provides a current path of the current which flows in the opposite direction of the current which flows to the motor 40.

The control unit 20 is provided with a FET 24, which is interposed in the current path, and a drive circuit 23 for driving the FET 24. The output signal from the MCU-2 is applied to the drive circuit 23 via a diode 28, and the divided voltage values of the resistances R1, R2, and R3 are applied thereto via a diode 29. When a low-level signal is input from the MCU-2 via the diode 28 and a low-level signal is also input from the diode 29, the drive circuit 23 outputs a high-level signal and turns on the FET 24. As a result, the electric power from the battery pack 2 is supplied to the motor 40. If at least one of the diodes 28 and 29 is at the high level, the drive circuit 23 outputs a low-level signal and turns off the FET 24.

If the discharge control signal of the battery pack 2 is at the high level when the operator turns on the switch 10, the S terminal becomes the low level, and the diode 29 outputs a low-level signal to the drive circuit 23. On the other hand, if the discharge control signal is at the low level when the switch 10 is turned on, the S terminal becomes the high level, and the diode 29 outputs a high-level signal to the drive circuit 23.

Meanwhile, if the MCU-2 predicts an abnormal state based on the voltage value detected by the voltage detecting circuit 26 and the current value detected by the current detecting circuit 27, the MCU-2 outputs a high-level signal to the drive circuit 23 as an alarm signal and turns off the FET 24 via the drive circuit 23 to stop driving of the electric tool.

Herein, examples of the prediction of an abnormal state by the MCU-2 based on the detection result of the voltage detecting circuit 26 include a case in which the voltage value is smaller than a first threshold value or is larger than a second threshold value. Herein, the second threshold value is larger than the first threshold value. The first threshold value is the voltage value which causes the battery cells of the battery set 3 to become overdischarge if the voltage becomes lower than that.

More specifically, the first threshold value is determined based on the battery pack 2 having a rated voltage corresponding to the electric-tool main body 1. For example, as described above, if the cell voltage is reduced to 2.0 V in the battery pack 2, it is judged to be overdischarge. Therefore, as the first threshold value, a numerical value TH1 obtained by multiplying the threshold value 2.0 V by the number n of the serially connected cells is used as the threshold value. In other words, the judgement criterion (in this case, the threshold value) for predicting an abnormality is determined by the same criterion in the electric-tool main body 1 and the battery pack 2. Alternatively, the judgement criterion may be different in the electric-tool main body 1 and the battery pack 2. For example, the first threshold value may set a value different from TH1 such as a lower limit value of the voltage value with which the electric-tool main body 1 is operable without taking the battery pack 2 into consideration. For example, in a case in which the motor 40 is a brushless motor, if a voltage lower than the rated voltage is applied, the motor 40 may be damaged. If the lower limit value is set as the first threshold value, damaging of the motor 40 can be suppressed. Thus, the first threshold value may be set in consideration of the rated voltage of the electric-tool main body 1.

Meanwhile, the first threshold value may be set so as to be varied in accordance with the current upon discharge, in other words, have current dependency. Regarding this, for example, when a high load is applied, the electric-tool main body 1 outputs a large current, and the voltage at this point is rapidly reduced. In such a state, in order to prevent prediction of an abnormality which may cause the MCU-2 to become overdischarge, the first threshold value is configured to depend on the current, so that the threshold value is also reduced upon large-current output (upon high load).

The second threshold value is determined based on an upper limit of the allowable voltage (rated voltage) of the electric-tool main body 1. For example, the second threshold value is set such that the voltage value applied to the motor 40 does not exceed the rated voltage of the motor 40. Moreover, the second threshold value also may have current dependency.

Examples of the prediction of an abnormal state by the MCU-2 based on the current detecting circuit 27 include a state in which the current value is smaller than a third threshold value, so that overdischarge is predicted to be occurring, and a case in which the current value is larger than a fourth threshold value, so that the rated current of the attached battery pack 2 is larger than the rated current of the electric-tool main body 1. Herein, the fourth threshold value is larger than the third threshold value.

Like the first and second threshold values having current dependency, the third and fourth threshold values may have voltage dependency.

The example shown in FIG. 1 and FIG. 2 is the case in which the three-terminal-configuration battery pack is attached to the monitoring-supporting electric-tool main body, if the battery pack 2 is a 14.4-V output type and the rated voltage of the electric-tool main body 1 is also 14.4 V, voltage monitoring of the battery cells can be appropriately carried out; therefore, usage of the electric tool by this combination is not problematic.

If the battery pack 2 is a 18-V output type and the rated voltage of the electric-tool main body 1 is 14.4 V, the voltage value according to the output result from the voltage detecting circuit 26 provided in the electric-tool main body 1 is judged to be larger than the second threshold value, the MCU-2 can turn off the FET 24 via the drive circuit 23 and prohibit usage of the electric tool. Alternatively, in this case, when the effective value of the voltage is configured to be the rated voltage of the electric-tool main body 1 by subjecting the FET 24 to PWM control and adjusting the duty ratio thereof without completely turning off the FET 24, the electric-tool main body 1 can be operated even if the battery pack 2 of the rated voltage higher than the rated voltage of the electric-tool main body 1 is attached.

According to the above configuration of the battery pack 2, when an abnormality is predicted, the MCU 31 can order the electric-tool main body 1 to shut off the current path of the electric-tool main body 1 by the discharge control signal and can turn off the FET 39 via the drive circuit 38 and shut off or reduce the output of the battery pack 2. For example, even when a contact defect is caused at the S terminal, electric power can be shut off or reduced independently in the battery pack 2 and the electric tool 2. As a result, the life of the battery pack 2 can be extended.

According to the above configuration of the electric-tool main body 1, the electric-tool main body 1 has the MCU-2, the voltage detecting circuit 26, and the current detecting circuit 27; therefore, if an abnormality is predicted from the voltage value and/or the current value in the electric-tool main body 1, supply of the electric power to the motor 40 can be shut off. Therefore, load on the battery cells can be reduced. Also in a case in which the alarm signal cannot be correctly output from the battery-pack-2 side due to, for example, a contact defect at the S terminal, the electric-tool main body 1 can independently predict an abnormality. Moreover, since the first to fourth threshold values can be independently set in the electric-tool main body 1, not only the control according to the standards of the battery pack 2, but also the control taking the standards of the electric-tool main body 1 (the rated voltage, the rated current of the motor 40), etc. into consideration can be carried out. As a result, the life of the electric-tool main body 1 can be also extended.

Figure 3:
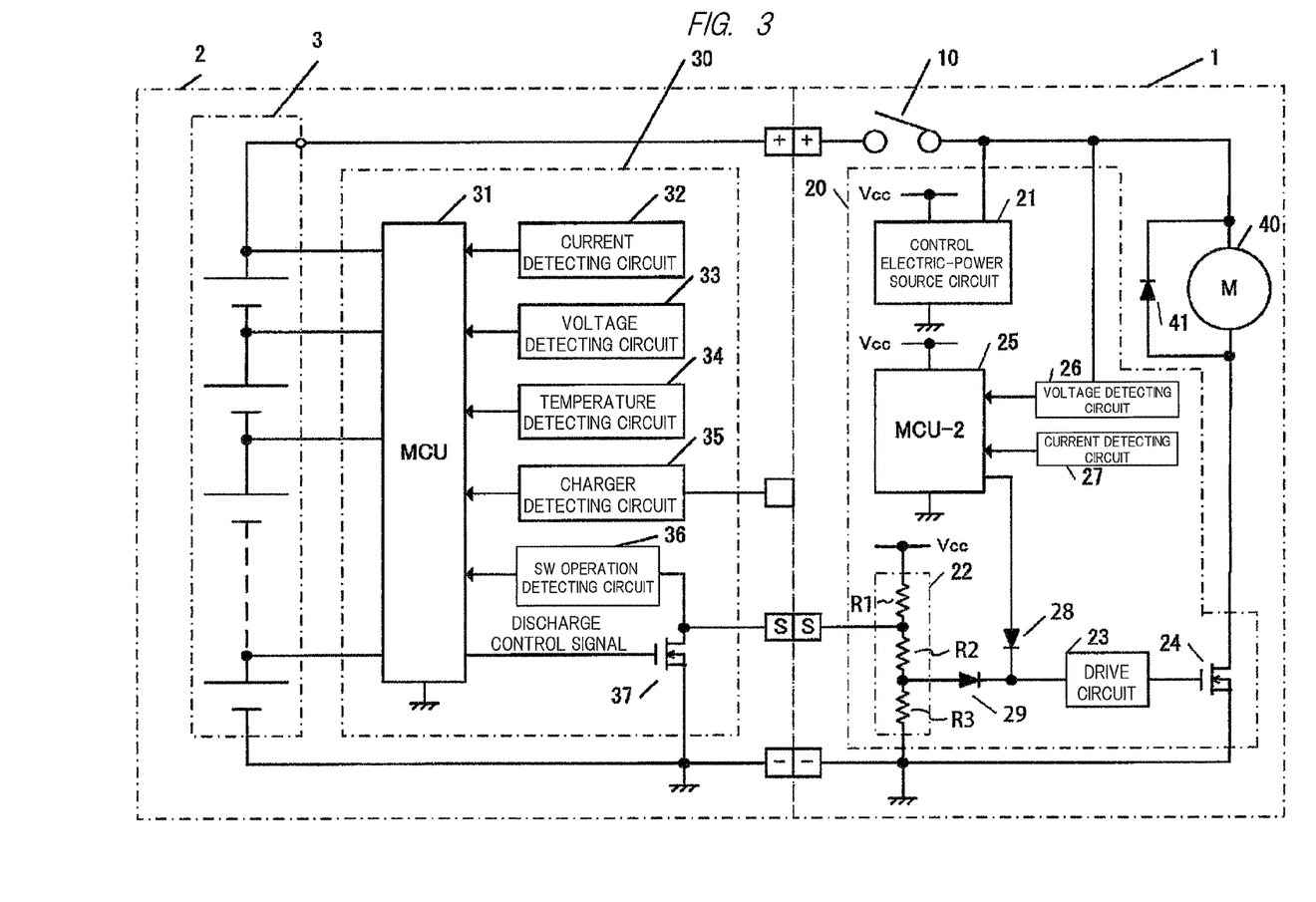
FIG. 3 is a block diagram showing an electric configuration of the battery pack and the electric-device main body according to a second embodiment of the present invention.

Next, with reference to FIG. 3, a second embodiment will be explained. The configuration of the electric-tool main body 1 of the second embodiment is the same as that of the first embodiment. Also, in the second embodiment, the point that the battery pack 2 does not have the drive circuit 38 and the FET 39 is different from the first embodiment. Therefore, in the second embodiment, as well as the first embodiment, when the MCU 31 predicts an abnormality, the MCU 31 outputs a low-level discharge control signal to the electric-tool main body 1. When the discharge control signal becomes low, the drive circuit 23 of the electric-tool main body 1 turns off the FET 24, thereby shutting off or suppressing supply of electric power to the motor 40.

According to the configuration of the electric-tool main body 1 of the second embodiment, even without the configuration of shutting off the supply of electric power in the battery pack 2, the electric-tool main body 1 can reliably shut off or suppress the supply of electric power to the motor 40.

Figure 4:
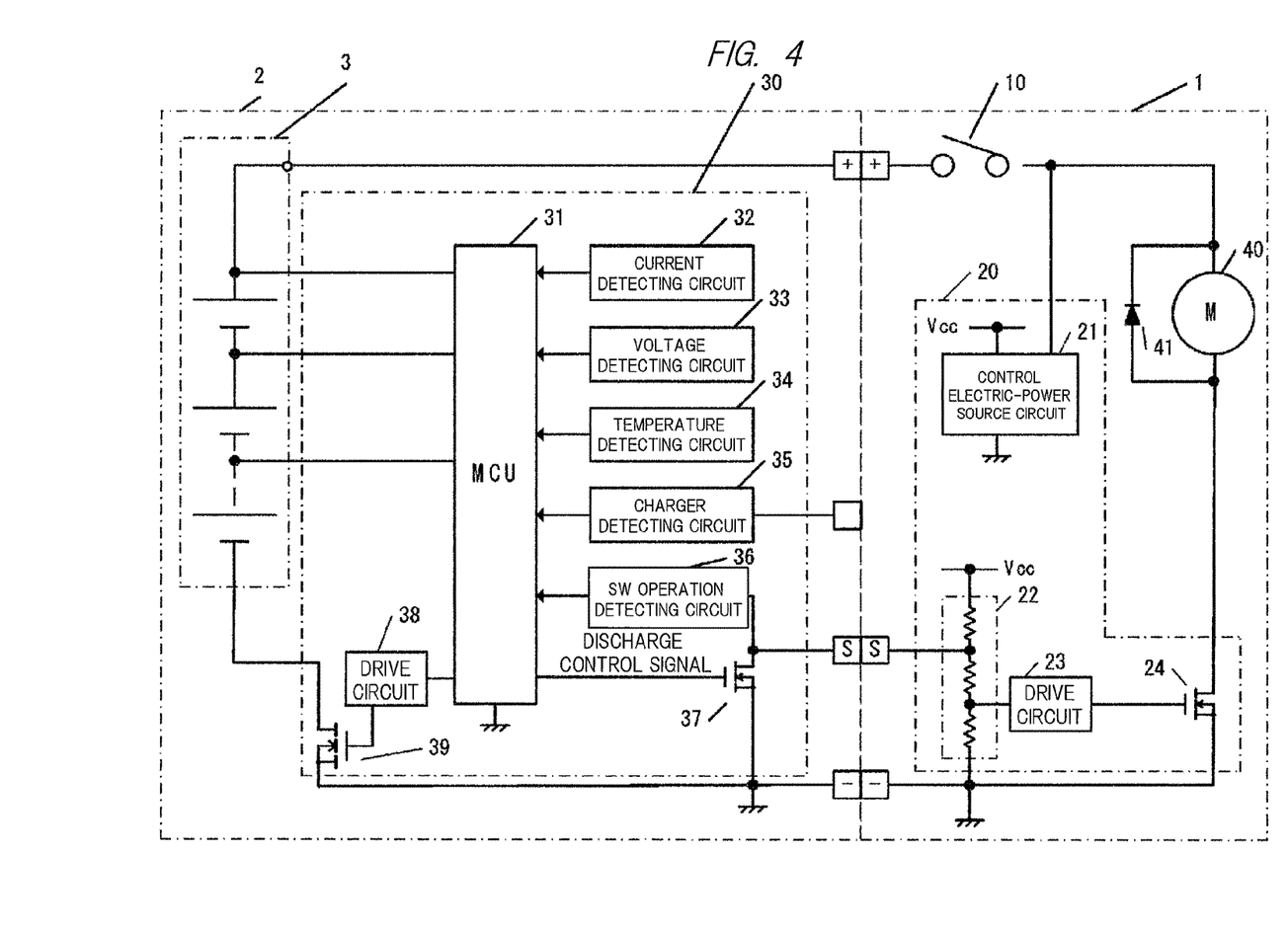
FIG. 4 is a block diagram showing an electric configuration of the battery pack and the electric-device main body according to a third embodiment of the present invention.

Next, a third embodiment will be explained with reference to FIG. 4. In the third embodiment, the configuration of the battery pack 2 is the same as that of the first embodiment. In the third embodiment, the point that the electric-tool main body 1 is not provided with the MCU-2, the voltage detecting circuit 26, the current detecting circuit 27, and the diode 28 is different from the first embodiment. Therefore, in the third embodiment, the MCU-2 does not predict abnormalities, the battery pack 2 causes the discharge control signal to be low, thereby changing the potential of the S terminal to high, and a high-level signal is input to the drive circuit 23. As a result, the FET 24 is turned off, and the drive circuit 23 can shut off the supply of electric power to the motor 40. Moreover, when the S terminal becomes the low level, the drive circuit 23 turns on the FET 24 and supplies electric power to the motor 40.

According to the configuration of the electric-tool main body 1 of the third embodiment, even though the electric-tool main body 1 does not independently predict the abnormality of input electric power, the supply of electric power to the motor 40 can be reliably shut off or suppressed.

Figure 5:
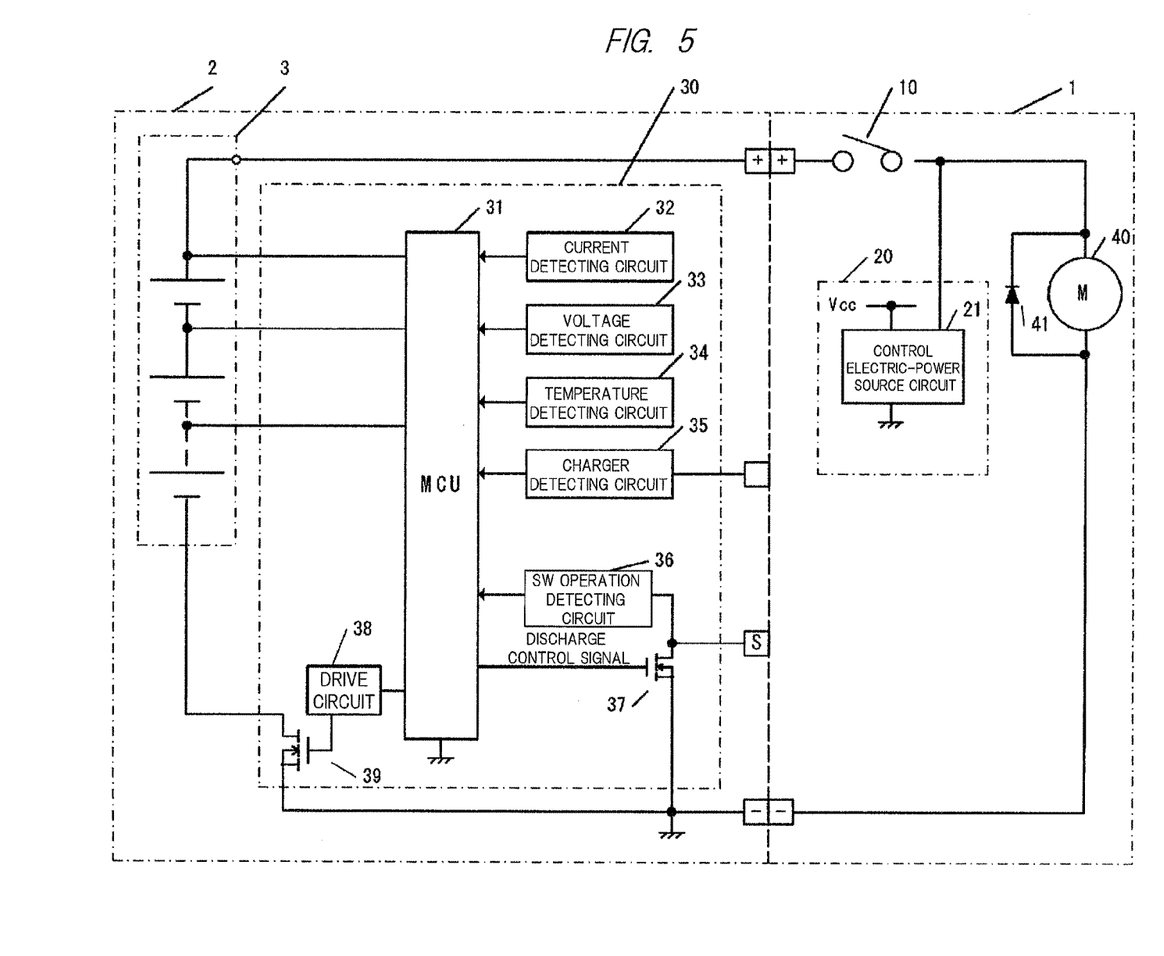
FIG. 5 is a block diagram showing an electric configuration of the battery pack and the electric-device main body according to a fourth embodiment of the present invention.

Next, a fourth embodiment will be explained with reference to FIG. 5. In the fourth embodiment, the configuration of the battery pack 2 is the same as the first embodiment. In the fourth embodiment, the point that the electric-tool main body 1 is not provided with the MCU-2, the voltage detecting circuit 26, the current detecting circuit 27, the resistance set 22, the drive circuit 23, the FET 24, and the S terminal is different from the first embodiment. In other words, the electric-tool main body 1 does not have the configuration to predict the abnormalities of the electric power supplied to itself (electric-tool main body 1), and furthermore, does not have the configuration to shut off or suppress the supply of electric power to the motor 40. Therefore, in the fourth embodiment, when the battery pack 2 predicts an abnormality, the supply of electric power to the electric-tool main body 1 is shut off or suppressed.

According to the configuration of the battery pack 2 of the fourth embodiment, even in the case in which the electric-tool main body 1 does not have the configuration to predict abnormalities and, furthermore, does not have the configuration to shut off or suppress the supply of electric power to the motor 40, the supply of electric power to the electric-tool main body 1 can be reliably shut off.

Note that, in the above-described embodiments, the electric-tool main body 1 connected to the battery pack 2 is shown as an example. However, the device connected to the battery pack 2 is not limited to the electric-tool main body 1, but is only required to be an electric device and, for example, may be an electric fan, flashlight, etc.

A first signal described in claims is the discharge control signal, a first electric-power control circuit is the MCU 31, a second switching element is the FET 39, a second electric-power control circuit is the drive circuit 38, a third switching element is the FET 29, a third electric-power control circuit is the MCU-2, and a third signal is a high-level signal. Moreover, a shut-off means is the FET 24, a state monitoring means is the voltage detecting circuit 26 and the current detecting circuit 27, and a judgement means is the MCU-2.

DESCRIPTION OF REFERENCE SIGNS

1 ELECTRIC-TOOL MAIN BODY
32 MICRO COMPUTING UNIT
32 CURRENT DETECTING CIRCUIT
33 VOLTAGE DETECTING CIRCUIT
38 DRIVE CIRCUIT
39 FET
2 BATTERY PACK
26 VOLTAGE DETECTING CIRCUIT
27 CURRENT DETECTING CIRCUIT
25 MICRO COMPUTING UNIT
40 MOTOR 23 DRIVE CIRCUIT
24 FET

The invention claimed is:

1. A battery pack detachably connectable through an electric-power supply path to an electric-device main body, the battery pack comprising:
at least one battery cell from which electric power is supplied to the electric-power supply path;
a detecting circuit detecting a status of the battery pack and outputting a detection signal;
a first electric-power control circuit connected to the detecting circuit, the first electric-power control circuit receiving the detection signal and outputting a first signal and a second signal if an abnormality in the battery pack is detected based on the detection signal;
an output terminal connected to the first electric-power control circuit, the output terminal outputting the first signal from the first electric-power control circuit to the electric-device main body; and
a second switching element connected to the first electric-power control circuit, the second switching element being provided on the electric-power supply path and shutting off the electric-power supply path or reducing electric power provided through the electric-power supply path to the electric-device main body if the second signal from the first electric-power control circuit is received.

2. The battery pack according to claim 1, wherein the battery pack is detachably and selectively connectable through the electric-power supply path to a first electric-device main body having a first switching element on the electric-power supply path, and a second electric-device main body not having the first switching element on the electric-power supply path.

3. The battery pack according to claim 2, further comprising a second electric-power control circuit,
wherein if the abnormality occurs in the battery pack, the second electric-power control circuit outputs the second signal to the second switching element for reducing or shutting off electric power, which is supplied to the first or second electric-device main body, connected to the battery pack, based on the second signal.

4. The battery pack according to claim 2, wherein the second electric-device main body has a switch, and when the switch is operated, the second electric-device main body allows supply of electric power regardless of output of the first signal.

5. The battery pack according to claim 2, wherein the first electric-device main body has a third electric-power control circuit, and if the abnormality occurs in the battery pack or the first or second electric-device main body, connected to the battery pack, the third electric-power control circuit outputs a third signal for reducing or shutting off electric power supplied through the electric-power supply path to the first switching element provided on the electric-power supply path.

6. The battery pack according to claim 2, wherein
the first electric-power control circuit detects as the abnormality that voltage of the battery pack becomes overdischarge, or current flowing in the electric-power supply path is larger than a threshold value, and
when detecting the abnormality, the first electric-power control circuit outputs the first signal.

7. An electric device comprising:
an electric-device main body which is one of a first electric-device main body having a first switching element on the electric power supply path and a second electric-device main body not having the first switching element on the electric-power supply path; and
a battery pack according to claim 1 connectable to the electric-device main body.

8. An electric device comprising:
a battery pack; and
an electric-device main body connected to the battery pack through an electric-power supply path, wherein the electric-device main body is only one of:
  a first electric-device main body including a first switching element provided on the electric-power supply path and a third electric-power control circuit outputting a third signal to the first switching element for reducing or shutting off electric power supplied through the electric-power supply path from the battery pack if an abnormality occurs at least in one of the battery pack and the first electric-device main body, or
  a second electric-device main body in which it is impossible to reduce or shut off electric power by the first switching element if the abnormality occurs at least in one of the battery pack and the second electric-device main body, wherein
the battery pack is to selectively connectable to the first electric-device main body and the second electric-device main body,
the battery pack includes:
  a detecting circuit detecting a status of the battery pack and outputting a detection signal;
  a first electric-power control circuit connected to the detecting circuit, the first electric-power control circuit receiving the detection signal and outputs a first signal and a second signal;
  an output terminal connected to the first electric-power control circuit, the output terminal outputting the first signal from the first electric-power control circuit to the electric-device main body; and
  a second switching element connected to the first electric-power control circuit, the second switching element being provided on the electric-power supply path, and
the first electric-power control circuit outputs (1) the second signal to the second switching element for reducing or shutting off electric power supplied through the electric-power supply path from the battery pack if the abnormality occurs in the battery pack or one of the first and second electric-device main bodies connected to the battery pack, and (2) the first signal to the first electric-device main body via the output terminal to control the first switching element for reducing or shutting off electric power supplied through the electric-power supply path from the battery pack if the abnormality occurs in the first electric-device main body connected to the battery pack or the battery pack.

9. The electric device according to claim 8, wherein
the first electric-device main body has a first threshold value to control the first switching element, and
the battery pack has a second threshold value to control the second switching element, the second threshold value being different from the first threshold value.

10. A system of a battery pack and an electric device including an electric-device main body, the battery pack detachably connected to the electric-device main body through the electric-power supply path, wherein
the battery pack comprising:
  at least one battery cell from which electric power is supplied to the electric-power supply path;
  a detecting circuit detecting a status of the battery pack and outputting a detection signal;
  a first electric-power control circuit connected to the detecting circuit, the first electric-power control circuit receiving the detection signal and outputting a first signal and a second signal if an abnormality in the battery pack is detected based on the detection signal;
  an output terminal connected to the first electric-power control circuit, the output terminal outputting the first signal from the first electric-power control circuit to the electric-device main body; and
  a second switching element connected to the first electric-power control circuit, the second switching element being provided on the electric-power supply path,
the electric-device main body is only one of:
  a first electric-device main body having a first switching element on the electric-power supply path; and
  a second electric-device main body not having the first switching element on the electric-power supply path,
if the abnormality in the battery pack connected to the first electric-device main body is detected, the first electric-power control circuit outputs the first signal to first electric-device-main body via the output terminal to control the first switching element to be shut off, and
if the abnormality in the battery pack connected to the second electric-device main body is detected, the first electric-power control circuit outputs the second signal to the second switching element and controls the second switching element to be shut off or reduce electric power provided through the electric-power supply path.

\* \* \* \* \*